(12) United States Patent
Savagaonkar et al.

(10) Patent No.: US 7,882,318 B2
(45) Date of Patent: Feb. 1, 2011

(54) TAMPER PROTECTION OF SOFTWARE AGENTS OPERATING IN A VITUAL TECHNOLOGY ENVIRONMENT METHODS AND APPARATUSES

(75) Inventors: Uday Savagaonkar, Beaverton, OR (US); Ravi Sahita, Beaverton, OR (US); David Durham, Beaverton, OR (US); Hormuzd Khosravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 379 days.

(21) Appl. No.: 11/529,828

(22) Filed: Sep. 29, 2006

(65) Prior Publication Data
US 2008/0082772 A1 Apr. 3, 2008

(51) Int. Cl.
*G06F 13/10* (2006.01)
(52) U.S. Cl. ..................................... 711/163
(58) Field of Classification Search ................ None
See application file for complete search history.

(56) References Cited

U.S. PATENT DOCUMENTS

| | | | |
|---|---|---|---|
| 4,809,160 A * | 2/1989 | Mahon et al. ............... 726/4 |
| 5,301,287 A | 4/1994 | Herrell et al. | |
| 5,469,556 A * | 11/1995 | Clifton ................ 711/163 |
| 5,619,723 A | 4/1997 | Jones et al. | |
| 5,627,987 A | 5/1997 | Nozue et al. | |
| 5,634,043 A | 5/1997 | Self et al. | |
| 5,751,989 A | 5/1998 | Harrison | |
| 5,913,923 A * | 6/1999 | Dunlap et al. ............ 710/100 |
| 5,926,549 A | 7/1999 | Pinkas | |
| 5,991,881 A | 11/1999 | Conklin et al. | |
| 6,075,938 A * | 6/2000 | Bugnion et al. ............. 703/27 |
| 6,105,137 A | 8/2000 | Graunke et al. | |
| 6,125,433 A | 9/2000 | Horstmann et al. | |
| 6,163,834 A | 12/2000 | Garcia et al. | |
| 6,321,276 B1 | 11/2001 | Forin | |
| 6,496,847 B1 | 12/2002 | Bugnion et al. | |
| 6,553,438 B1 | 4/2003 | Coffman et al. | |
| 6,567,897 B2 | 5/2003 | Lee et al. | |
| 6,671,791 B1 | 12/2003 | McGrath | |

(Continued)

FOREIGN PATENT DOCUMENTS

EP 1 681 630 A1 7/2006

(Continued)

OTHER PUBLICATIONS

U.S. Appl. No. 11/541,474—Non-final OA mailed May 12, 2009.

(Continued)

*Primary Examiner*—Duc T Doan
(74) *Attorney, Agent, or Firm*—Schwabe, Williamson & Wyatt, P.C.

(57) ABSTRACT

Methods, apparatuses, articles, and systems for comparing a first security domain of a first memory page of a physical device to a second security domain of a second memory page of the physical device, the security domains being stored in one or more registers of a processor of the physical device, are described herein. Based on the comparison, the processor disallows an instruction from the first memory page to access the second memory page if the first security domain is different from the second security domain. Resultantly, software agents, in particular, critical software agents, may be protected in a virtual technology (VT) environment more efficiently and effectively.

28 Claims, 4 Drawing Sheets

U.S. PATENT DOCUMENTS

| | | | |
|---|---|---|---|
| 6,684,305 | B1 | 1/2004 | Deneau |
| 6,732,220 | B2 | 5/2004 | Babaian et al. |
| 6,738,882 | B1 | 5/2004 | Gau |
| 6,751,720 | B2 | 6/2004 | Barroso et al. |
| 6,751,737 | B1 | 6/2004 | Russell et al. |
| 6,760,787 | B2 | 7/2004 | Forin |
| 6,804,741 | B2 | 10/2004 | Cowan |
| 6,823,433 | B1 | 11/2004 | Barnes et al. |
| 6,850,994 | B2 | 2/2005 | Gabryjelski |
| 6,883,116 | B2 | 4/2005 | Lee et al. |
| 6,907,600 | B2 | 6/2005 | Neiger et al. |
| 6,920,534 | B2 | 7/2005 | Dover |
| 6,922,766 | B2 | 7/2005 | Scott |
| 6,931,540 | B1 | 8/2005 | Edwards et al. |
| 6,961,852 | B2 | 11/2005 | Craft |
| 6,996,551 | B2 | 2/2006 | Hellerstein et al. |
| 7,010,630 | B2 | 3/2006 | Pagan |
| 7,028,229 | B2 | 4/2006 | McGuire et al. |
| 7,058,768 | B2 * | 6/2006 | Willman et al. ............. 711/154 |
| 7,103,779 | B2 | 9/2006 | Kiehtreiber et al. |
| 7,107,497 | B2 | 9/2006 | McGuire et al. |
| 7,111,200 | B2 | 9/2006 | Armstrong et al. |
| 7,225,325 | B2 | 5/2007 | Rhoades |
| 7,260,690 | B2 | 8/2007 | Brucklmayr et al. |
| 7,270,193 | B2 | 9/2007 | Hashimoto et al. |
| 7,328,453 | B2 | 2/2008 | Merkle et al. |
| 7,409,472 | B2 | 8/2008 | Iwatani et al. |
| 7,478,394 | B1 | 1/2009 | de Dinechin et al. |
| 7,516,453 | B1 | 4/2009 | Bugnion |
| 7,542,026 | B2 | 6/2009 | Pagan |
| 7,558,966 | B2 | 7/2009 | Durham et al. |
| 7,577,848 | B2 | 8/2009 | Schwartz et al. |
| 7,581,085 | B1 * | 8/2009 | Koryakin et al. ............ 712/220 |
| 7,581,256 | B2 | 8/2009 | Cockerille et al. |
| 7,594,124 | B2 | 9/2009 | Durham et al. |
| 7,603,484 | B2 | 10/2009 | Dai et al. |
| 7,644,287 | B2 | 1/2010 | Oerting et al. |
| 7,650,504 | B2 | 1/2010 | Bodrov |
| 7,653,727 | B2 | 1/2010 | Durham et al. |
| 7,669,242 | B2 | 2/2010 | Sahita et al. |
| 2002/0082824 | A1 | 6/2002 | Neiger et al. |
| 2003/0229808 | A1 | 12/2003 | Heintz et al. |
| 2004/0030911 | A1 | 2/2004 | Isozaki et al. |
| 2004/0039924 | A1 | 2/2004 | Baldwin et al. |
| 2004/0064668 | A1 | 4/2004 | Kjos et al. |
| 2004/0226009 | A1 | 11/2004 | Mese et al. |
| 2005/0097355 | A1 * | 5/2005 | England et al. ............. 713/200 |
| 2005/0132122 | A1 | 6/2005 | Rozas |
| 2005/0138417 | A1 | 6/2005 | McNerney et al. |
| 2005/0198051 | A1 | 9/2005 | Marr et al. |
| 2005/0213768 | A1 | 9/2005 | Durham et al. |
| 2005/0289311 | A1 | 12/2005 | Durham et al. |
| 2006/0026387 | A1 | 2/2006 | Dinechin et al. |
| 2006/0026569 | A1 | 2/2006 | Oerting et al. |
| 2006/0156398 | A1 | 7/2006 | Ross et al. |
| 2006/0236125 | A1 | 10/2006 | Sahita et al. |
| 2006/0265557 | A1 * | 11/2006 | Peinado et al. ............. 711/154 |
| 2006/0294596 | A1 | 12/2006 | Govindarajan et al. |
| 2007/0005935 | A1 | 1/2007 | Khosravi et al. |
| 2007/0005992 | A1 | 1/2007 | Schluessler et al. |
| 2007/0006175 | A1 | 1/2007 | Durham et al. |
| 2007/0006307 | A1 | 1/2007 | Hahn et al. |
| 2007/0156999 | A1 | 7/2007 | Durham et al. |
| 2007/0157003 | A1 | 7/2007 | Durham et al. |
| 2008/0082722 | A1 | 4/2008 | Savagaonkar et al. |
| 2008/0250216 | A1 | 10/2008 | Kershaw et al. |
| 2009/0172814 | A1 | 7/2009 | Khosravi et al. |

FOREIGN PATENT DOCUMENTS

| | | |
|---|---|---|
| EP | 1681630 | 7/2006 |
| JP | H05257811 | 10/1993 |
| JP | 2006196005 | 7/2006 |
| JP | 2008257735 | 10/2008 |
| WO | WO-9847072 | 10/1998 |
| WO | 200779011 | 7/2007 |
| WO | 200779011 A2 | 7/2007 |

OTHER PUBLICATIONS

U.S. Appl. No. 11/541,474—Non-final OA mailed Nov. 24, 2009.
U.S. Appl. No. 11/173,851—Non-final OA mailed Apr. 1, 2009.
U.S. Appl. No. 11/173,851—Non-final OA mailed Jan. 21, 2010.
U.S. Appl. No. 11/173,885—Non-final OA mailed Dec. 14, 2009.
U.S. Appl. No. 11/171,859—Non-final OA mailed Jan. 21, 2009.
U.S. Appl. No. 11/171,859—Notice of Allowance mailed Jun. 19, 2009.
U.S. Appl. No. 11/171,859—Notice of Allowance mailed Oct. 6, 2009.
U.S. Appl. No. 11/322,669—Non-final OA mailed Aug. 21, 2009.
U.S. Appl. No. 11/173,142—Non-final OA mailed Jun. 7, 2007.
U.S. Appl. No. 11/173,142—Non-final OA mailed Feb. 13, 2008.
U.S. Appl. No. 11/173,142—Non-final OA mailed Oct. 22, 2008.
U.S. Appl. No. 11/173,142—Final OA mailed Jul. 15, 2009.
U.S. Appl. No. 11/173,813—Non-final OA mailed Jun. 20, 2007.
U.S. Appl. No. 11/428,335—Non-final OA mailed Jun. 26, 2006.
U.S. Appl. No. 11/428,335—Non-final OA mailed Mar. 6, 2008.
U.S. Appl. No. 11/428,335—Non-final OA mailed Oct. 20, 2008.
U.S. Appl. No. 11/428,335—Notice of Allowance mailed Apr. 24, 2009.
U.S. Appl. No. 11/174,315—Non-final OA mailed Feb. 17, 2009.
U.S. Appl. No. 11/174,315—Final OA mailed Sep. 1, 2009.
U.S. Appl. No. 11/173,587—Non-final OA mailed Dec. 5, 2008.
U.S. Appl. No. 11/173,587—Notice of Allowance mailed May 1, 2009.
Duc, G. et al.: "CryptoPage: An Efficient Secure Architecture with Memory Encryption, Integrity and Information Leakage Protection", Computer Security Applications Conference, 2006. ACSAC, 22nd Annual. Dec. 2006, pp. 483-492.
Levy, J. et al.: "Hiding Your Wares: Transparently Retrofitting Memory Confidentiality into Legacy Applications", Communications, 2007. ICC, IEEE International Conference on Jun. 24-28, 2007, pp. 1368-1372.
Yan, Chenyu et al.: "Improving Cost, Performance, and Security of Memory Encryption and Authentication", Computer Architecture, 2006. ISCA, 33rd International Symposium, pp. 179-190.
Windows Platform Design Notes: Standardizing Out-Of-Band Management Console Output and Terminal Emulation (VT-UTF8 and VT100+), Oct. 24, 2001, 15 pages, http://download.microsoft.com/download/1/6/1/161ba512-40e2-4cc9-843a-923143f3456c/StandardinzingOutOfBandManagementConsoleOutput090.doc.
Apple Computer, Inc.: Mac OS C ABI Macho-o File Format Reference, Mar. 8, 2006, 64 pages (copyright 2003, 2006 Apple, Inc.).
Collins: Intel's System Management Mode, 1999, 8 pages, http://www.rcolling.org/ddj/Jan97/Jan97.html.
Draheim: AMD64/EM64T—The Coming Market, May 4, 2004, 5 pages, http://www2.informatik.hu-berlin.de/~draheim/article/em64t.html.
Grevstad: CPU-Based Security: The NX Bit, Juniperimages, May 24, 2004, 3 pages.
Markatos, et al.: User-Level DMA without Operating System Kernel Modification, Feb. 1-5, 1997, pp. 322-331; High Performance Computer Architecture, 1999, IEEE 3rd International Symposium.
Microsoft Corp.: Microsoft Portable Executable and Common Object File Format Specification, Revision 6.0, Feb. 1999, 77 pages.
Red Hat, Inc.: Red Hat Enterprise Linux 4: Using as, the Gnu Assembler, copyright 2004, 302 pages.
Sheveley: Enhance Virtualization on Intel Architecture-Based Servers, Technology@Intel Magazine, Apr. 2005, pp. 1-9.
The PC Guide: Direct Memory Access (DMA) Modes and Bus Mastering DMA, Apr. 17, 2001; 3 pages; http:www.pcguide.com/ref/hdd/if/ide/modesDMA-c.html.

Tools Interface Standards (TIS): Executable and Linkable Format (EIF), Portable Formats Specification, Version 1.1, 262 pages; TIS Committee, Oct. 1993.

Uhlig, Rich et al.: Intel Virtualization Technology, IEEE Computer Society, May 2005, pp. 48-56.

WEBOPEDIA: Bus; Dec. 1, 2002; http://isp.webopedia.com/TERM/B/bus.html.

WEBOPEDIA: DMA; Nov. 11, 2003, 2 pages, http://www.webopedia.com/TERM/DMA.html.

WEBOPEDIA: Kernal, Mar. 12, 2002, 2 pages, http:www.webopedia.com/TERM/k/kernel.html.

Zhang: Memory Management in JikesNode Operating System, 2005, A thesis submitted to the University of Manchester for the degree of Master of Science in the Faculty of Science and Engineering, pp. 1, 27 and 29.

Chinese Patent Application No. 200710300374.5; Chinese First Office Action issued Mar. 27, 2009, 9 pages.

Chinese Patent Application No. 200710192913.8; Chinese First Office Action issued Jun. 26, 2009, 15 pages.

Korean Patent Application No. 10-2007-98808 KIPO's Notice of Preliminary Rejection issued Apr. 28, 2009, 5 pages.

Office Action, mailed on Jun. 15, 2010, for JP Patent Application 2007-278175, 8 pages.

Mahon et al., "Hewlett-Packard Precision Architecture: The Processor," 1266 Hewlett-Packard Journal 37 (1986) Aug., No. 8, Amstelveen, Netherlands, 19 pages.

Steve Furber, Revised ARM Processor, Japan, CQ Publishing Co., Ltd., Dec. 18, 2001, First Version, p. 257-273.

Steve Furber, "ARM System-on Chip Architecture," year of 2000, pp. 291 to 310, 2nd edition, published by Pearson Education Limited, Great Britain.

* cited by examiner

TAMPER PROTECTION OF SOFTWARE AGENTS OPERATING IN A VITUAL TECHNOLOGY ENVIRONMENT METHODS AND APPARATUSES

TECHNICAL FIELD

Embodiments relate to the fields of data processing and information assurance, in particular, to protecting software agents operating in a virtual technology (VT) environment from tampering by disallowing an instruction of a first memory page to access a second memory page if the two pages do not belong to the same protection domain.

BACKGROUND

Memory based attacks are a significant threat to the security of information processing systems. Some such attacks involve storing malicious code, such as a virus or a worm, in the memory of a computer system, then exploiting bugs and/or buffer overflows while running legitimate programs to transfer control to the malicious code. One approach to preventing this type of attack is to include an "execute disable" bit in a page table entry that may be used to designate pages where data is stored as non-executable, so that malicious code could not be stored as data and subsequently executed within the same physical, linear or logical memory space.

Additional approaches include using memory page tables to store "color" attributes that are associated with agents (reflective of their security and/or privilege domains) to logically partition memory at a fine enough granularity to prevent an agent of one color from accessing memory associated with another. This approach, however, is limited to assigning relatively few "colors" (and therefore relatively few security enclaves) because of the limited number of bits available in page tables. Further, advances in processor technology may eliminate the availability of these bits as "color" indicators.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include, but are not limited to, methods and apparatuses for comparing a first security domain of a first memory page of a physical device to a second security domain of a second memory page of the physical device, with the security domains stored in one or more registers of a processor of the physical device. Based on the comparison, the processor disallows an instruction from the first memory page to access the second memory page if the privilege domain of the first security domain is different from that of the second security domain. Resultantly, software agents, in particular, critical software agents, may be protected in a virtual technology (VT) environment more efficiently and effectively.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
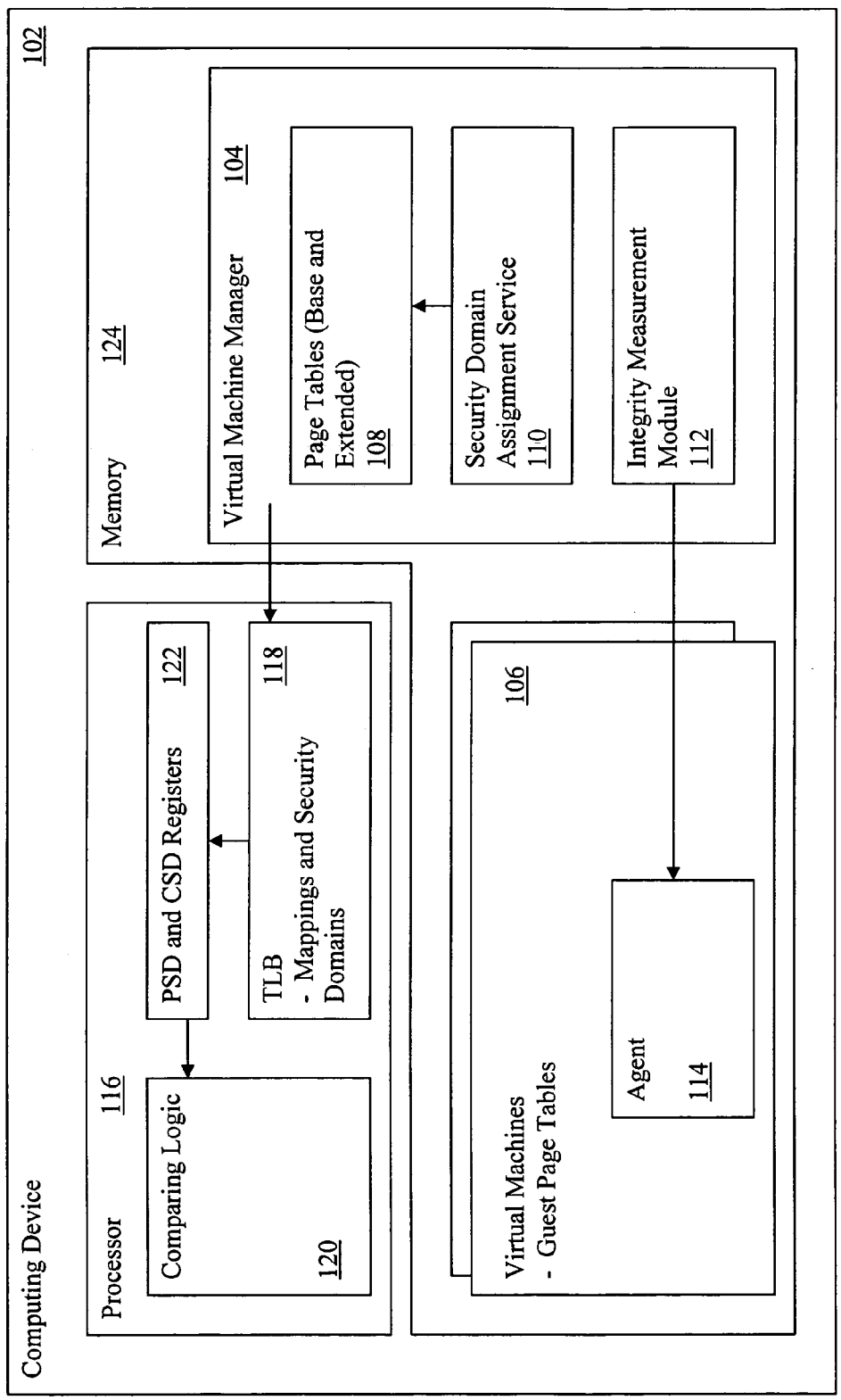
FIG. 1 illustrates an overview of various embodiments of the present invention.

FIG. 1 illustrates an overview of various embodiments of the present invention. As illustrated, comparing logic 120 of processor 116 may compare a security domain associated with a memory page (allocated e.g. to agent 114) to a security domain of a second memory page (that an instruction of agent 114 has attempted to reference or access). Based on the results of the comparison, the comparing logic 120 may either cause a page fault and disallow the reference or access, or may not disallow the reference or access. The security domains associated with the two memory pages may be stored in the translation lookaside buffer (TLB) 118 of the processor 116 of computing device 102, and copied into a previous security domain (PSD) and a current security domain (CSD) register 122 of the processor 116 (when the two memory pages are the previous and current memory pages in an attempted memory page reference or access). The security domains may have been previously assigned by a security domain assignment service 110 (e.g. of virtual machine manager 104) and stored in page tables 108, used by the virtual machine manager (VMM) 104 to translate guest physical addresses of virtual machines 106 to host physical addresses of processor 116 (prior to getting copied into TLB 118).

In various embodiments, the virtual machines (VM) 106 and virtual machine manager 104 may be executed by the same or different processor cores or processors of computing device 102, such as processor 116, and may be stored in memory of computing device 102, such as memory 124. The virtual machines 106 may include programs and modules, such as agent 114 (which may be either a program or a module of a program), and in one embodiment, guest page tables (not shown). The virtual machine manager 104, in addition to the earlier described page tables 108 and security domain assignment service 110, may, in some embodiments, include an integrity measurement module 112 capable of verifying the integrity of the agent 114 as it is loaded in memory.

Figure 4:
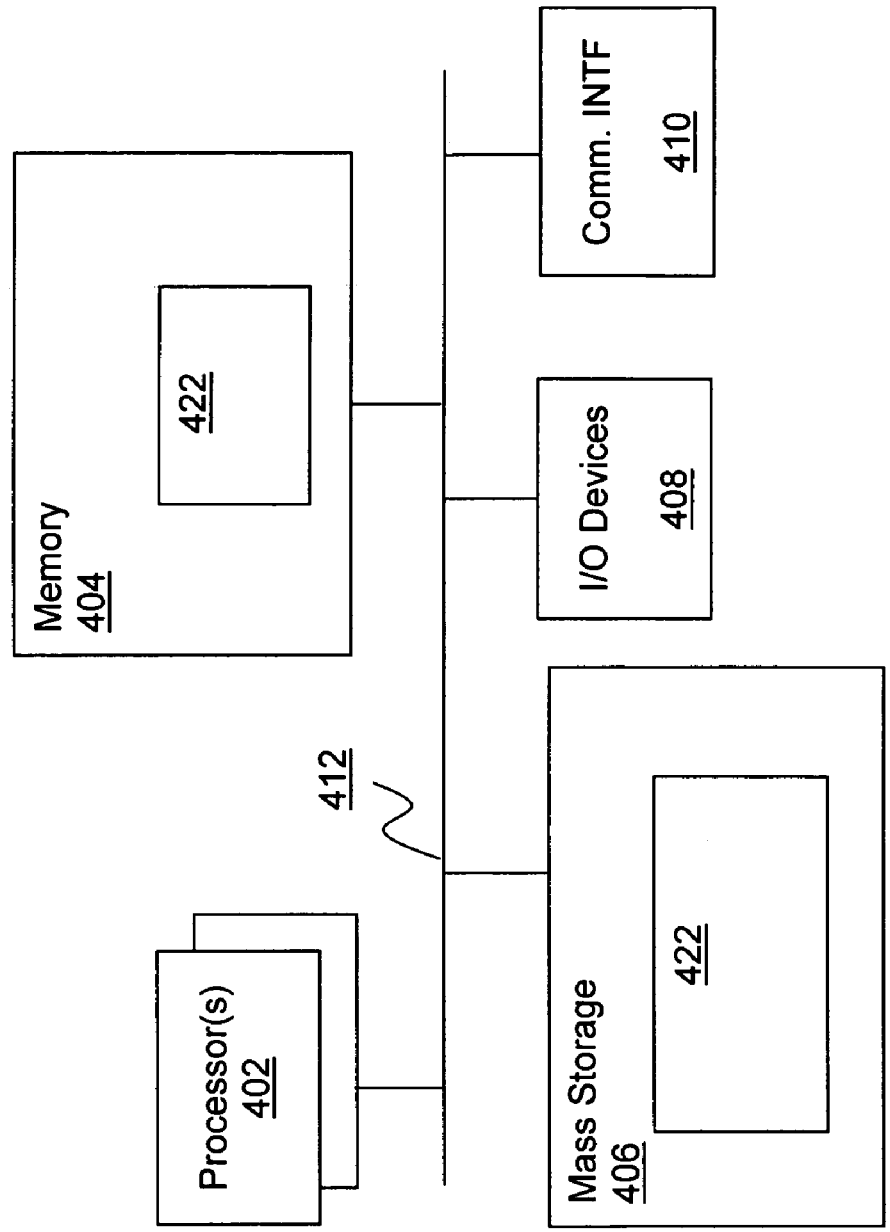
FIG. 4 illustrates an example computer system suitable for use to practice various embodiments of the present invention.

In various embodiments, except for the teachings of the embodiments of the present invention incorporated therein, computing device 102 may be any single-or multi-processor or processor core central processing unit (CPU) computing system known in the art. Computing device 102 may be a personal computer (PC), a workstation, a server, a router, a mainframe, a modular computer within a blade server or high-density server, a personal digital assistant (PDA), an entertainment center, a set-top box or a mobile device. The computing device 102 may be capable operating a plurality of operating systems of a plurality of virtual machines, such as virtual machine 106, and of a virtual machine manager 104 using virtualization technologies. If computing device 102 is a multi-processor or multi-processor core system (not shown in FIG. 1), each virtual machine/virtual machine manager of computing device 102 may be operated by a processor or processor core dedicated to that virtual machine/virtual machine manager. In a single processor or single processor core computing device 102 (such as that illustrated by FIG. 1), the plurality of virtual machines and virtual machine manager 104 may be operated by the single processor or processor core (such as processor 116). An exemplary single-/multi-processor or processor core computing device 102 is illustrated by FIG. 4, and is described in greater detail below. Hereinafter, including in the claims, the terms "processor" and "processor core" shall be used interchangeable, with each term including the other, unless the context clearly indicates otherwise.

In some embodiments, VMM 104 may comprise a service partition of the computing device 102, managing the actual hardware resources of device 102, including memory pages, such as the memory page of agent 114 and the memory page that the instruction is attempting to access, and coordinating the use of the resources among the virtual machines computing device 102.

Virtual machine 106, except for the teachings of embodiments of the embodiments of the present invention, may be any sort of virtual machine. Virtual machine 106 may be a self-contained operating environment that behaves as if it is a separate computer system. To an outside system coupled to computing device 102 through a networking fabric, virtual machine 106 may appear to be a separate computing device. Virtual machine 106 may also have an operating system capable of managing multiple agents, such as agent 114, and may have a protected memory space that operationally belongs exclusively to virtual machine 106. In one embodiment, virtual machine 106 may include guest page tables (not shown) containing mappings between linear addresses and guest physical addresses. As described above, virtual machine 106 also includes an agent 114 and is operated by processor 116. Suitable virtual machines and virtualization technologies include but are not limited to those available from Microsoft Corporation of Redmond, Wash., VMware, Inc. of Palo Alto, Calif., and XenSource of Cambridge, UK.

As is also illustrated, VMM 104 may include page table 108 structures. In some embodiments, illustrated below by FIG. 3, the page tables 108 may be organized in a hierarchical manner for mapping guest physical addresses of virtual machine 106 to host physical addresses of the computing device 102 and for storing security domains for memory pages of the computing device 102. For example, page tables 108 may include base and extended page tables, providing mappings of linear virtual addresses of virtual machine 106 to guest physical addresses of virtual machine 106, of the guest physical addresses to host physical addresses of the computing device 102, and as well as storing security domains for memory pages of the computing device 102. Page tables 108 may be updated by the VMM 104 in response to the loading of virtual machine 106 components, such as agent 114, to add entries for those components mapping their guest physical addresses to point to host physical memory pages. Further, the extended page tables 108 may be referenced by a processor register called the extended page table pointer (EPTP). The EPTP could contain certain bits making it capable of marking security domain configuration options. The various levels of extended page tables may comprise extended page table entries (EPTEs) capable of storing all or a portion of the security domain. Since EPTEs may form a multi-level paging structure, protection domain bits from multiple levels could be combined to identify protection domains uniquely. Exemplary EPTP and EPTE structures are described below in greater detail in reference to FIG. 3.

In some embodiments, as alluded to earlier, the VMM 104 may include a security domain assignment service 110 (hereinafter, assignment service) capable of determining security domains for agents, associating the determined domains with the memory page or pages of the agents, and storing the determined domains in the EPTE structure(s) pointing to the memory page or pages. The assignment service 110 may assign a unique security domain to each agent and may assign the same security domain to associated modules of the same agent or to associated agents. Also, assignment service 110 may assign special security domains to base components of virtual machine 106 and to legacy applications. Base components, such as the scheduler, loader, and memory manager may be assigned a supervisory security domain allowing their instructions to access memory pages possessing different security domains. In this sense, the security domains are partially ordered, and some of the security domains may be more privileged than others (though not always). Legacy applications may not be assigned a security domain (or are given a security domain of "0"), and as such, may not access memory pages having security domains. In various embodiments, the assignment service 110 may also determine features associated with the determined security domain, such as whether the memory page to which the domain is assigned is a hidden memory page. In one embodiment, described below in reference to FIG. 3, portions of the security domain may be stored in multiple EPTEs in a nested fashion. In such embodiments, the assignment service 110 may assign agents from a logical group, such as network drivers, a portion of the security domain that is the same for each agent, and a portion that is unique for each agent module, thus allowing for a logical organization of the assigned security domains. In alternate embodiments, the assignment service 110 may be a component of a virtual machine, such as virtual machine 106, rather than a component of VMM 104.

In various embodiments, as alluded to earlier, VMM 104 may also include an integrity measurement module (IMM) 112 capable of verifying the integrity of agent 114 as the agent 114 is loaded in virtual machine 106 memory. The IMM 112 may use any method known in the art to attest to the integrity of the agent 114, such as cryptographic hashes of memory pages. By verifying the integrity of agent 114, the IMM 112 may provide an additional layer of security, allowing the detection of a corruption of agent 114 before even assigning its security domain. In some embodiments, the computing device 102 may include an additional virtual machine (not shown), which may include the IMM 112. In such embodiments, integrity services (not shown) of the VMM 104 may map copies of the memory pages of agent 114 into the additional virtual machine for evaluation by the IMM 112, which may return a verification result for the agent.

In various embodiments, as alluded to earlier, virtual machine 106 may comprise one or more applications, such as agent 114. Agent 114 may be any sort of agent, including a program or module of a program having instructions needing to access memory pages of other agents. Such access may be a read or write access, or a jump or call to transition to the agent stored in the memory page attempting to be accessed. Agent 114 may be a legitimate (or infected) agent of the virtual machine 106, or may be a malicious program, such as a worm or virus. In some embodiments, agent 114 may be one of a number of trusted virtual machine 106 base components, such as a scheduler, loader, memory manager, or security domain assignment service 110 (if not implemented by the VMM 104). Such components may, as described above, be assigned a special supervisory security domain allowing instructions of the components 114 to access memory pages having a different security domain. In other embodiments, agent 114 may be a legacy application that is not assigned a security domain. As described above, agent 114 may be stored in a memory page of the virtual machine 106 that is itself associated with a security domain.

As illustrated, except for the teachings of the embodiments of the present invention, processor 116 may be any of a variety of different types of processors, such as a processor in the Pentium® Processor Family, the Itanium® Processor Family, or other processor families from Intel Corporation, or any other general purpose or other processor from another company. Processor 116 may execute virtual machine 106 and its agents, virtual machine manager 104 and its agents, and may include one or more TLBs 118, with the TLB 118 modified to store security domains of memory pages, and having associated comparing logic 120, and CSD and PSD registers 122. TLB 118 may be enhanced to copy the security domains assigned and stored in page tables 108 for various memory pages by security domain assignment service 110 of VMM 104. Upon processing an instruction of agent 114 seeking to access a memory page, memory management logic of virtual machine 106, VMM 104 and processor 116 may map the linear address referenced by the instruction to a guest physical address obtained from guest page tables (not shown) of the virtual machine 106, which may then be mapped by the logic to a host physical address of the actual memory page referred to by the linear address of the instruction. The mapping of the guest physical address to a host physical address may be obtained from the page tables 108 of VMM 104, which may be extended page tables. TLBs 118 may be extensively used in this process to cache various levels of address translation. The logic of processor 116 may then copy the security domain of the memory page currently stored in CSD register 122 into PSD register 122, and the security domain of the memory page being accessed into CSD register 122. The logic 120 further compares the current and previous security domains in the CSD and PSD registers 122 to determine whether to disallow the reference/access.

In various embodiments, TLB 118 may be any translation lookaside buffer known in the art, with the exception of the modifications to store the security domains. Additionally, TLB 118 may cache mappings of linear memory addresses referenced by the instruction to guest physical addresses, and of the guest physical addresses to host physical addresses pointing to the memory page the instruction is attempting to references access. The security domains and mappings of the TLB 118 may be updated by logic of the processor 116.

As alluded to earlier, processor 116 may include PSD and CSD registers 122 and comparing logic 120 to compare the security domains stored in the PSD and CSD registers 122. The comparison may be performed according to any known approach. For example, if the security domains are associated with numerical values, the comparing logic 120 may determine if the values are the same, if one or both values are zero (representing no security domain, as discussed above), or if one or both values are a default value, such as a maximum, representing a supervisory security domain. The comparing logic 120 may then use the result obtained by the comparison to disallow the instruction to reference or access the memory page. In one embodiment, comparing logic 120 may not disallow the reference or access when the security domain of the memory page containing the instruction is the same as the security domain of the memory page that the instruction is attempting to reference or access, and may disallow the reference or access when the security domains are different. Comparing logic 120 may disallow the reference or access by triggering a page fault exception.

Further, comparing logic 120 may determine whether to disallow the reference or access based on additional criteria. For example, one security domain (e.g., "0") may represent no security domain, such that a memory page marked with no security domain may be accessed by any other page. Also, as mentioned above, an EPTE of page tables 108 may include a field or bit which defines whether the page is hidden. The bit may be set to zero to allow any other page to read from the referenced page, regardless of the result of the security domain comparison, or set to one to enable comparing logic 120 to disallow read references or accesses based on the security domain comparison. In some embodiments, the hidden bit may be retrieved with the security domain by processor 116 logic and may be stored in the page tables of the TLB 118. Write references or accesses may be prevented regardless of the setting of the hidden bit.

Also, comparing logic 120 may determine whether to disallow the reference or access based on instruction control flow. For example, an instruction may be used to mark allowed entry points to a program. In an embodiment according to the architecture of the Pentium® Processor Family, a new instruction (e.g., a "Directed Address Vector" or "DAV" instruction) may be added for this purpose. If a jump or other control flow instruction is executed from a memory page of one security domain to a DAV instruction in a memory page of another security domain, the reference or access may not be disallowed. However, if the jump is to a page of another security domain, but not to a DAV instruction, the reference or access may be disallowed. Therefore, the DAV instruction may be used to allow entry into a program only at an expected point which may provide a defined, secure interface. Jumps to random or unexpected sections of a program from a program of another security domain may be prevented. Finally, the DAV instruction may only be executed in pages that are executable (e.g., not eXecute Disabled using the XD bit according to the architecture of the Pentium® 4 and other Processor Families), assuring that data pages with spurious bit sequences appearing to be a DAV instruction will not be executed by the processor 116.

Furthermore, comparing logic 120 may also enable page fault reporting to include whether a page fault was caused by a security domain mismatch or violation. For example, comparing logic 120 in triggering a page fault, may provide the indication, such that a bit in a page fault error code (e.g., bit 5 of the page fault error code pushed onto the stack according to the architecture of the Pentium® Processor Family) may be designated as a security domain violation bit, and be set to one to indicate that the page fault was triggered by a security domain mismatch. This bit may be interpreted in the context of other flags. For example, if the security domain violation was caused by an instruction fetch, an instruction fetch bit in the error code may be set to one. If the security domain violation was caused by a read or a write, a read/write bit may be set to a zero for a read or a one for a write. Additionally, the linear address of the memory page of agent 114 that caused the fault may be saved, for example in the CR2 control register of a processor according to the architecture of the Pentium® Processor Family.

As illustrated, the memory 124 of computing environment 102 may be any sort of memory device known in the art, except VMM 104, VM 106, and their components, capable of storing instructions that may be executed by processor 116. Memory 124 may, in one embodiment, be partitioned among a number of virtual machines, including at least VMM 104 and VM 106.

In summary, security domain assignment service 110 may be added to assign security domains to memory pages. Page tables 108 and TLB 118 may be enhanced to store the assigned security domains, and processor 116 may be modified to include PSD and CSD registers 122 to store security domains of current and previous memory pages, and comparing logic 120 to compare the security domains of the previous and current memory pages to determine whether to disallow the reference/access.

Figure 2:
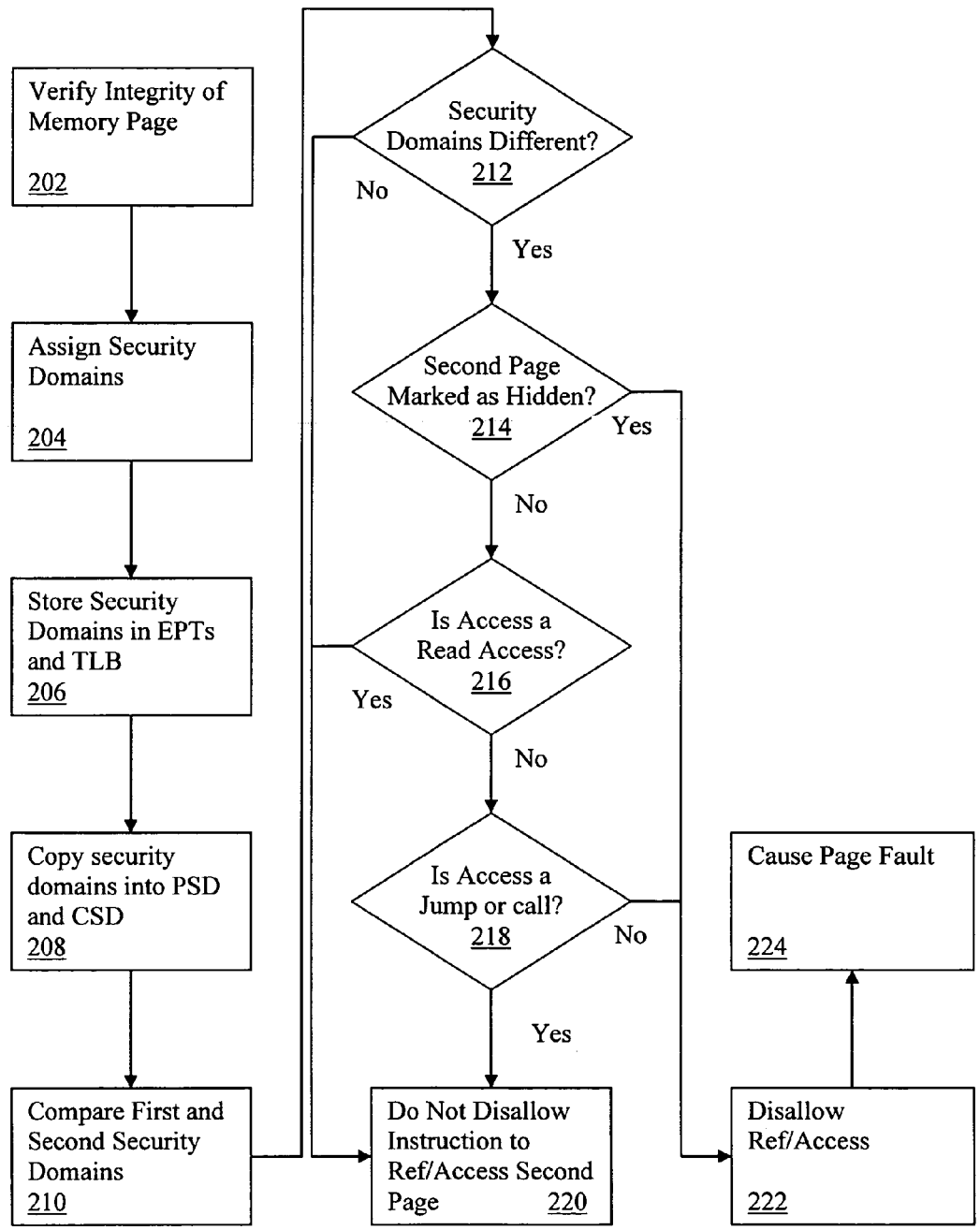
FIG. 2 illustrates a flow chart view of selected operations of the methods of various embodiments of the present invention.

FIG. 2 illustrates a flow chart view of selected operations of the methods of various embodiments of the present invention. As is shown, in various embodiments, an integrity measurement module (IMM) of the computing device may verify the integrity of computing device agents each time a one of those agents is spawned in memory, block 202. The IMM may reside in a virtual machine manager (VMM) of the computing device, or in a virtual machine (VM) of the computing device that does not include the agent being verified. The IMM may receive a copy of the memory page including the agent, and may verify the agent in the manner described above in reference to FIG. 1. Upon verifying the agent, a security domain assignment service of the VMM may assign security domains to the agents of the VMs of the computing device, block 204. The assignment service may associate the assigned security domain with all memory pages allocated to the agents by storing the security domain in the corresponding extended page table entry (EPTE) structures of extended page tables of the VMM, and may set security domain configuration values, such as the hidden bit described above in the extended page table pointer (EPTP) structure associated with the EPTE, which in turn are copied and stored in the TLB, block 206.

As is further described above, when a processor associated with a VM of the computing device agents an instruction of an agent residing in a first memory page of the computing device, the instruction attempting a reference or access of a second memory page, logic of the processor may update the security domains of the previous and current memory pages stored in the PSD and CSD registers, block 208.

Once the security domain of the second memory page has been retrieved and stored, comparing logic of the processor may compare the security domains stored in the PSD and CSD, block 210. Based at least partially on the results of the comparison, the comparing logic may not disallow the instruction to reference or access the second memory page, block 220, or may disallow the access, block 222. In addition to the comparison of security domains, the comparing logic may be adapted to perform a number of other tests. For example, the comparing logic may determine if the security domain of the first memory page is different from the security domain of the second memory page, block 212. If the security domains are the same, the comparing logic may not disallow the access, block 220. If, on the other hand, the security levels are different, the comparing logic may further determine if the hidden bit, mentioned above, is set for the second memory page, block 214. If the hidden bit is set, the comparing logic may disallow the access, block 222. However, if the hidden bit is not set, the comparing logic may further determine whether the attempted access is a read reference or access, block 216. If the reference or access is a read reference or access, the comparing logic may not disallow the access, block 220. On the other hand, if the reference or access is not a read reference or access, the comparing logic may determine if the reference or access is a control flow transition, such as a jump or a call instruction, to an approved entry point of the second memory page (discussed above as a "DAV instruction"), block 218. If the instruction is a jump or a call to an allowed entry point, the comparing logic may not disallow the instruction, block 220. If the instruction is not a jump or a call, or is a jump or a call to memory other than an approved entry point, the comparing logic may disallow the instruction from referencing or accessing the second memory page, block 222.

If the instruction has been disallowed from referencing or accessing the second memory page, the comparing logic may trigger a page fault, block 224. In some embodiments, the page fault may include a descriptor of the type of reference or access, and an address of the first memory page attempting the disallowed reference or access.

Figure 3:
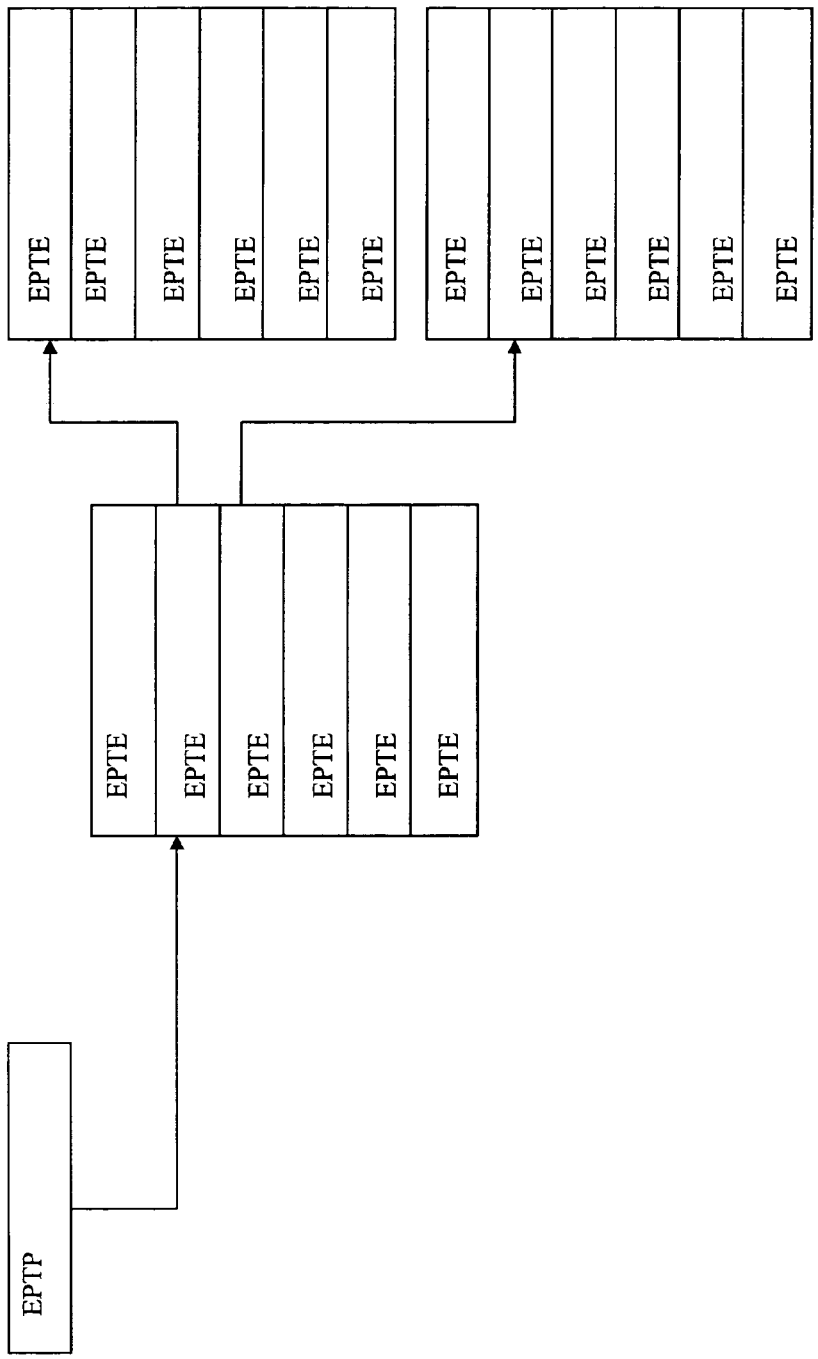
FIG. 3 illustrates exemplary extended page table structures adapted to store memory page security domains in a logically ordered fashion.

FIG. 3 illustrates exemplary extended page table structures adapted to store memory page security domains in a logically ordered fashion. Shown in the left-most block is an exemplary Extended Page Table Pointer (EPTP) capable of storing security domain preferences. The EPTP may be, for example, a 64 bit structure comprising configuration/permission bits, a physical address (48 bit field) of a 4 KB memory page that holds 512 Extended Page Table Entries, such as the EPTE blocks shown in the middle and right series of blocks, and a number of reserved bits. The reserved bits may be used to indicate whether the memory page being accessed by the instruction has an assigned security domain, whether the page is hidden, whether the page is a transition page (DAV), etc. The EPTE blocks shown in the middle and right may be EPTE of a memory page pointed to by the EPTP block. The EPTE blocks may include, for instance, a 40-bit address field which provides the address of a page frame that is the physical page frame attempting to be accessed by the instruction, or may instead provide the address of another memory page including another 512 EPTEs that may be further used for address translation. The EPTE blocks in the middle that are shown pointing to EPTE blocks on the right constitute such pointing EPTEs. Also, 10 bits of the EPTE may be used to store a security domain.

In some embodiments, the CPU may parse at least two domains of EPTEs, such as those in the middle and right series of blocks, to translate the guest physical address of the memory page attempting to be accessed. Thus, because two EPTEs are associated with any given page frame, 20 bits may be used for assigning a security domain to a memory page. Also, because the 10 bits of the first EPTE may be shared by up to 512 memory page frames, the security domain assignment service may make use of this artifact to partition the security domain space in a logical fashion (e.g., all network drivers sharing the same first ten bits of their security domains).

FIG. 4 illustrates an example computer system suitable for use to practice various embodiments of the present invention. As shown, computing system 400 includes a number of processors or processor cores 402 (such as processor 116), and system memory 404 (such as memory 124). For the purpose of this application, including the claims, the terms "processor" and "processor cores" may be considered synonymous, unless the context clearly requires otherwise. Additionally, computing system 400 includes mass storage devices 406 (such as diskette, hard drive, compact disc read only memory (CDROM) and so forth), input/output devices 408 (such as keyboard, cursor control and so forth) and communication interfaces 410 (such as network interface cards, modems and so forth). The elements are coupled to each other via system bus 412, which represents one or more buses. In the case of multiple buses, they are bridged by one or more bus bridges (not shown). In various embodiments, mass storage devices 406 may be divided into multiple partitions for use by the virtual machines, with each virtual machine having exclusive use of the assigned partition.

Each of these elements performs its conventional functions known in the art. In particular, processor(s) 402 is (are) enhanced with the earlier described enhanced TLB, PSD and CSD registers, and security domain comparison logic. Further, system memory 404 and mass storage 406 may be employed to store a working copy and a permanent copy of the programming instructions implementing the security domain assignment service, the IMM, and so forth, herein collectively denoted as 422. The instructions 422 may be compiled from assembler instructions supported by processor(s) 402 or high domain languages, such as C.

The permanent copy of the programming instructions may be placed into permanent storage 406 in the factory, or in the field, through, for example, a distribution medium (not shown), such as a compact disc (CD), or through communication interface 410 (from a distribution server (not shown)).

The constitution of these elements 402-412 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. A method comprising:
   assigning by a virtual machine manager disposed in a memory of a computing device and operated by a processor of the computing device, a first security domain to a first memory page of the memory of the computing device, and a second security domain to a second memory page of the memory of the computing device, wherein the virtual machine manager manages a plurality of virtual machines disposed in the memory and operated by the processor, wherein the virtual machines include a plurality of programs, and the processor is enhanced with a previous security domain register and a current security domain register;
   storing by the virtual machine manager information indicative of the first security domain in a first extended page table entry structure that references the first memory page, and information indicative of the second security domain in a second extended page table entry structure that references the second memory page, the first and second extended page table entry structures being part of a page table structure managed by and disposed within the virtual machine manager;
   copying by the processor, the information indicative of the first security domain and the information indicative of the second security domain to the previous security domain register and the current security domain register, respectively, if an instruction residing in the first memory page attempts to reference or access the second memory page, wherein the instruction belongs to one of the plurality of programs of the plurality of virtual machines;
   comparing by the processor, using the previous security domain register and the current security domain register, the first and second security domains of the first and second memory pages; and
   determining by the processor, whether to allow or to disallow the instruction from the first memory page to reference or access the second memory page based at least in part on said comparing.

2. The method of claim 1, wherein the copying by the processor further comprising copying by the processor, the information indicative of the first and second security domains from a translation lookaside buffer and storing the information indicative of the first and second security domains into the previous security domain register and the current security domain register respectively, when the reference or access is attempted.

3. The method of claim 2, further comprising retrieving the information indicative of the first and second security domains from the page table structure managed by the virtual machine manager of the computing device, and caching the retrieved information indicative of the first and second security domains in the translation lookaside buffer, wherein the page table structure includes extended page tables comprising:
   a plurality of extended page table pointer structures, each indicating whether a security domain has been set for an associated memory page and features associated with the security domain, and
   a plurality of extended page table entry structures storing security domains assigned to associated memory pages.

4. The method of claim 3, wherein at least some of the extended page table entry structures having different nesting levels from each other, further comprising storing information indicative of a plurality of security domains in a plurality of bits of the plurality of extended page table entry structures.

5. The method of claim 1, wherein disallowing comprises causing a page fault by the processor, and the instruction of the first memory page is disallowed to reference or access the second memory page, if the first security domain is different from the second security domain.

6. The method of claim 1, further comprising determining whether the second memory page is a hidden memory page, and disallowing the instruction of the first memory page to reference or access the second memory page in response to the second memory page being a hidden memory page.

7. The method of claim 6, further comprising determining whether the reference or access is a read or write reference or access, and, if the second memory page is not a hidden memory page, not disallowing the instruction to reference or access the second memory page if the first security domain is different from the second security domain and the reference or access is a read reference or access, and disallowing the instruction to reference or access the second memory page if the first security domain is lower than the second security domain and the reference or access is a write reference or access.

8. The method of claim 1, further comprising not disallowing the instruction to reference or access the second memory page if the reference or access is one of a jump or a call to an allowed entrypoint of the second memory page, regardless of whether the first security domain is different from the second security domain.

9. The method of claim 1, further comprising not disallowing the instruction to reference or access the second memory page if the second security domain is not higher privileged than at least a predetermined security domain.

10. The method of claim 1, wherein the second memory page stores at least a portion of a critical operating system component, and the second security domain is a supervisory security domain.

11. The method of claim 1, wherein the assigning by the virtual machine manager is performed by a security domain assignment service of the virtual machine manager of the computing device.

12. The method of claim 11, wherein the security domain assignment service is further configured to assign a supervisory security domain for base components of a virtual machine, including scheduler, loader, and memory manager of the virtual machine.

13. The method of claim 1, further comprising verifying integrity of an agent of the first virtual machine of the computing device allocated with the first memory page by an integrity measurement module of a virtual machine manager of the computing device.

14. The method of claim 1, wherein the information indicative of the first and second security domains are respectively stored in at least 10 bits of the first and second extended page table entry structures.

15. The method of claim 1, further comprising partitioning by the virtual machine manager, a plurality of security domains into one or more logical groups associated with various levels of extended page table entry structures.

16. The method of claim 1, wherein not disallowing the instruction to reference or access the second memory page at least partially in response to a determination that the reference or access is one of a jump or a call to an allowed entrypoint of the second memory page, regardless of whether the first security domain is different from the second security domain further comprises not disallowing the instruction to reference or access the second memory page in response to a determination that the reference or access is one of a jump or a call to an allowed entrypoint of the second memory page, and the second memory page is marked as executable.

17. A processor comprising:
a translation lookaside buffer;
a previous security domain register and a current security domain register coupled with the translation lookaside buffer, and configured to:
copy information indicative of first and second security domains of first and second memory pages into the previous and current security domain registers, respectively, from the translation lookaside buffer, if an instruction residing in the first memory page attempts to reference or access the second memory page,
wherein the first and second memory pages are memory pages of a memory coupled with the processor,
wherein the information indicative of the first and second security domains are assigned to the first and second memory pages, respectively, by a virtual machine manager disposed in the memory and operated by the processor,
wherein the information indicative of the first and second security domains are stored by the virtual machine manager in a first and a second extended page table entry structures that reference the first and second memory pages respectively,
wherein the first and second extended page table entry structures are part of the virtual memory manager disposed in the memory and operated by the processor,
wherein the memory further includes a number of virtual machines managed by the virtual machine manager, and wherein the number of virtual machines have a plurality of programs, respectively, all operated by the processor, and
wherein the instruction belongs to one of the plurality of programs; and
a comparing logic configured to
compare the first security domain of the first memory page to the second security domain of the second memory page, and
not disallow an instruction from the first memory page to reference or access the second memory page in response to the first security domain having a privilege level higher than or equal to the second security domain.

18. The processor of claim 17, wherein the first or second security domains copied from the translation lookaside buffer were retrieved and stored in the translation lookaside buffer from page tables of a virtual machine manager, and the page tables of the virtual machine manager are extended page tables managed by the virtual machine manager, comprising:
a plurality of extended page table pointer structures, each configured to indicate whether a security domain has been set for an associated memory page and features associated with the security domain, and
a plurality of extended page table entry structures configured to store security domains assigned to associated memory pages.

19. The processor of claim 17, wherein the comparing logic is further adapted to cause a page fault, if the first security domain is different from the second security domain, to disallow the instruction to reference or access the second memory page.

20. The processor of claim 17, wherein the comparing logic is further adapted to determine whether the second memory page is a hidden memory page, and the instruction of the first memory page is also disallowed to reference or access the second memory page if the second memory page is a hidden memory page.

21. The processor of claim 20, wherein the comparing logic is further adapted to determine whether the reference or access is a read or write reference or access, and if the second memory page is not a hidden memory page, not disallow the instruction to reference or access the second memory page if the first security domain is different from the second security domain and the reference or access is a read reference or access, and disallow the instruction to reference or access the second memory page if the first security domain is different from the second security domain and the reference or access is a write reference or access.

22. The processor of claim 17, wherein the comparing logic is further adapted to not disallow the instruction to reference or access the second memory page if the reference or access is one of a jump or a call to an allowed entrypoint of the second memory page, regardless of whether the first security domain is different from the second security domain.

23. The processor of claim 17, wherein the second memory page stores at least a portion of a critical operating system component, and the second security domain of the second memory page is a supervisory security domain.

24. A system comprising:
mass storage having stored therein a virtual machine manager, and at least one critical operating system component program instantiable into a critical operating system component agent of a virtual machine; and a processor coupled to the mass storage, the processor including a translation lookaside buffer;

a previous security domain register and a current security domain register coupled to the translation lookaside buffer and configured to:

copy information indicative of first and second security domains of first and second memory pages of the system into the previous and current security domain registers, respectively, from the translation lookaside buffer, if an instruction residing in the first memory page attempts to reference or access the second memory page, wherein the first and second memory pages are memory pages of a memory coupled with the processor, wherein the information indicative of the first and second security domains are assigned to the first and second memory pages, respectively, by the virtual machine manager disposed in the memory and operated by the processor, wherein the information indicative of the first and second security domains are stored by the virtual machine manager in a first and a second extended page table entry structures that reference the first and second memory pages respectively, wherein the first and second extended page table entry structures are part of a virtual memory manager disposed in the memory and operated by the processor, wherein the memory further includes a number of virtual machines having a plurality of programs, all operated by the processor, wherein the instruction belongs to one of the plurality of programs, and the second memory page having at least a portion of the critical operating system component agent of the virtual machine; and a comparing logic coupled to the registers and adapted to compare the first security domain of the first memory page to the second security domain of the second memory page, and not disallow an instruction from the first memory page to access the second memory page in response to the first security domain having a privilege level higher or equal to the second security domain.

25. The system of claim 24, wherein the first and second security domains stored in the previous and current security domain registers were copied from the translation lookaside buffer, and were cached in the translation lookaside buffer from page tables of a virtual machine manager of the system, and the page tables of the virtual machine manager are extended page tables comprising:

a plurality of extended page table pointer structures, each configured to indicate whether a security domain has been set for an associated memory page and features associated with the security domain, and a plurality of extended page table entry structures configured to store security domains assigned to associated memory pages.

26. The system of claim 24, wherein the comparing logic is further adapted to cause a page fault, if the first security domain is different from the second security domain, to disallow the instruction to reference or access the second memory page.

27. The system of claim 24, wherein the comparing logic is further adapted to not disallow the instruction to reference or access the second memory page if the reference or access is one of a jump or a call to an allowed entrypoint of the second memory page, regardless of whether the first security domain is different from the second security domain.

28. The system of claim 24, wherein the critical operating system component agent is assigned a supervisory security domain.

* * * * *